United States Patent [19]

Holden, Jr.

[11] 4,360,491

[45] Nov. 23, 1982

[54] FLOATING REMOLDING SHOES FOR FOAM THERMOFORMING MOLDS

[75] Inventor: Morell J. Holden, Jr., Canandaigua, N.Y.

[73] Assignee: Mobil Oil Corporation, New York, N.Y.

[21] Appl. No.: 242,007

[22] Filed: Mar. 9, 1981

[51] Int. Cl.³ .................. B29C 17/00; B29C 1/00; B29D 27/00
[52] U.S. Cl. .................. 264/294; 264/321; 264/322; 264/DIG. 66; 425/398; 425/400; 425/DIG. 41
[58] Field of Search .............. 264/294, 321, DIG. 66, 264/322; 425/398, 400, DIG. 41

[56] References Cited

U.S. PATENT DOCUMENTS

| | | | |
|---|---|---|---|
| 3,172,927 | 3/1965 | Mojonnier | 264/294 X |
| 3,504,074 | 3/1970 | Snow | 264/153 |
| 3,518,334 | 6/1970 | Carrigan et al. | 264/89 |
| 3,669,606 | 6/1972 | Brown | 425/398 |
| 3,923,948 | 12/1975 | Jackson et al. | 264/161 |
| 4,009,981 | 3/1977 | Rosen | 425/388 |
| 4,053,549 | 10/1977 | Vandor | 264/293 |

Primary Examiner—Philip E. Anderson
Attorney, Agent, or Firm—Charles A. Huggett; Michael G. Gilman; James F. Powers, Jr.

[57] ABSTRACT

A shape-preserving device which is attached to the top and bottom mold section of a thermoforming machine which reciprocatingly thermoforms articles from a heat-softened plastic sheet. The device includes a cavity mold attached to one mold section and a remolding shoe assembly attached to the other. The remolding shoe assembly includes a floating remolding shoe attached to the outer end of a piston rod connected to a pressurized fluid-actuated pneumatic cylinder which is in unimpeded flow communication with a source of compressed air. As the sheet indexing movement is completed, the mold cavity and the floating shoe clamp the rearmost portion of the rearmost articles produced by the preceding shot and maintain a substantially constant pressure upon this portion while at least one mold section continues to move to full close position, while the succeeding mold shot is being completed, and while the mold section to which the floating shoe is attached moves away from the thermoformed sheet through a distance somewhat greater than the depth of the thermoformed articles.

13 Claims, 8 Drawing Figures

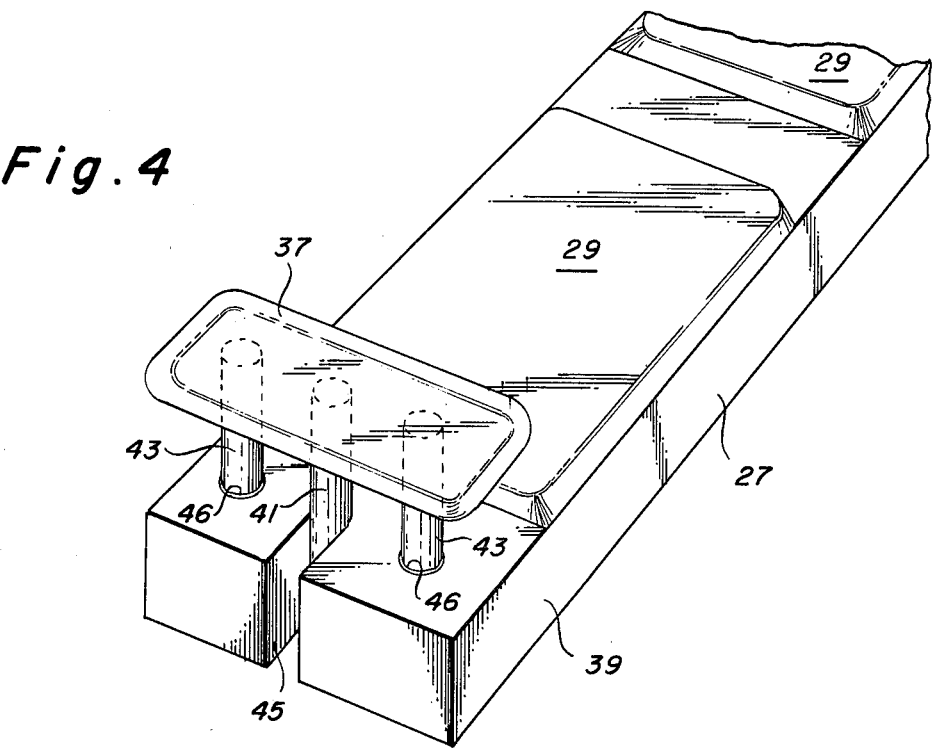
Fig. 4
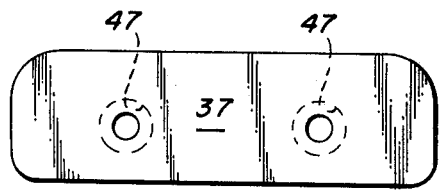
Fig. 5
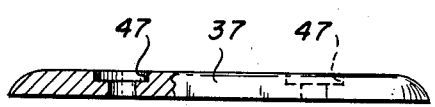
Fig. 6
Fig. 7
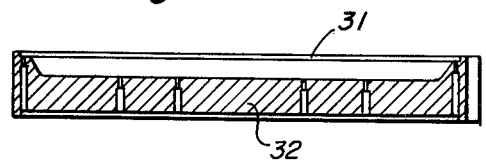
Fig. 8

4,360,491

FLOATING REMOLDING SHOES FOR FOAM THERMOFORMING MOLDS

BACKGROUND OF THE INVENTION

1. Field of the Invention

This invention relates to manufacturing rigid plastic articles from continuous sheets of thermoformable plastics, such as foamed polystyrene and the like. It particularly relates to devices and methods for minimizing warping of such articles along the sides and edges thereof. It especially relates to a thermoforming technique and an improved mold design to maintain or restore the desired shape of a polystyrene foam article, such as a meat tray, during molding of the subsequent shot of articles.

2. Review of the Prior Art

Thermoformed articles are often manufactured by roll-fed thermoforming machines equipped with matched metal molds, consisting of both plugs and cavities which contain the detailed shapes that are desired on the inside and outside, respectively, of the articles being thermoformed from a continuous sheet of heat-softened plastic, such as acrylonitrile-butadiene-styrene, nylon, polycarbonate, oriented polystyrene, foamed polystyrene, polypropylene, and the like. With the exception of some minor post-mold expansion that is generally inherent with thermoformed foamed products and some overall parts shrinkage that typically occurs, it is desirable that the thermoformed part otherwise remain dimensionally consistent to the size and shape of the production mold.

When thermoformable plastics are extruded and formed into a sheet, selected amounts of cross-machine and machine-direction orientation are generally built into the sheet by stretching the extruded sheet in both directions as it cools, in order to obtain a number of desirable properties. When such as sheet is later heated to a critical temperature, it tends to shrink in both directions, thereby creating stresses in the plane of the sheet if this shrinking is resisted.

During the manufacture of plastic articles by continuous thermoforming operations on a thermoformable sheet of this type, the roll-fed sheet initially passes through an oven while its edges are being gripped by endlessly moving pins which are mounted on a pair of parallel belts or chains. Cross-machine tensile stresses in the extruded sheet are thereby relieved somewhat and utilized to maintain the sheet in horizontal posture, i.e., to prevent significant sagging of the sheet while it is passing through the oven.

However, the machine-direction orientation stresses are simply passed along to the continuously interconnected sheet passing through the thermoforming machine. These stresses are frequently manifested at the inlet end of the forming section of the machine, particularly after the molding period when the mold opens and the sheet is being indexed out of the forming station of the machine. For this reason, the rear wall of the rearmost row of articles is apt to be deformed by being pulled to a shallower angle (relative to the horizontal plane), even before the succeeding shot begins. Such distortion or deformation reduces the overall height of the molded product and creates a condition that causes inconsistent product trimming.

It is believed that certain stresses additionally occur in the heat-softened thermoplastic sheet when it is formed between the mold cavities (female) and the mold plugs (male). These stresses are balanced in the thin strips between adjacent molded articles, both in the machine direction and in the cross machine direction. However, at the edges of a roll-fed thermoforming machine, there are no opposing stresses to balance the inward stresses in the cross-machine direction created by the outermost mold plugs except for the pins of the sheet conveying mechanism along the edges of the sheet. This characteristic is particularly noticable in the machine direction at the exit end of the mold and along the rearmost edge of a shot of newly thermoformed articles.

For example, in high-speed thermoforming operations of a roll-fed thermoforming machine, the thermoformable sheet is indexed forward an amount approximately equal to the length of the molds while the molds are in open position. This indexing operation moves the finished parts of a completed sheet out of the mold area and moves a sheet of moldable material from the oven into the mold area.

As the sheet indexing operation is nearly completed, the mold sections begin to close. One mold section, containing the cavities, generally closes to the sheet line before the other mold section, containing the plugs, reaches the other surface of the sheet.

During the interval between the time that the mold cavities contact one surface of the sheet and the time that the mold plugs reach their full closed position, tensile stresses occur in the plane of the sheet as the plastic articles are thermoformed to the desired shape. Along the forward edge in the machine direction, these stresses are transmitted as stretching forces to the rearmost row of newly thermoformed articles of the previous shot that are alongside the molding machine, thereby tending to draw the rearmost edges of these existing articles into the mold area while the current mold shot is being formed. To cope with this condition, known past practice has been alternatively to provide a sheet clamping bar on the inlet (oven end) of the mold, provide a sheet clamping bar on the exit end of the mold, to pinch the sheet prior to the mold closing, or to extend the fixed mold by an additional cavity, or portion thereof, on the exit end for remolding the last row of thermoformed parts. U.S. Pat. No. 4,009,981, for example, teaches the use of clamping bars in the form of gates at both the inlet and exit ends of the mold station of the machine. Each of these techniques only partially solves the problem of part distortion, because the clamping bar does not reshape the thermoformed part if the part has already become distorted and because the overlap thermoforming technique allows the mold, as it is forming the new shot, to stress the rear side of the last row of parts before the overlap section of the mold fully contacts the previously thermoformed parts.

There is consequently a need for a device and method that will: (a) obviate transmittal of these in-sheet stresses from the molding machine to the last row of newly formed thermoformed articles, (b) preserve the shape of the newly thermoformed articles along this last row, and (c) if necessary, even reshape these newly thermoformed articles if distortion has developed such as through the indexing operations or from contracting forces in the thermoformable sheet during the molding operation, due to machine-direction orientation.

SUMMARY OF THE INVENTION

It is accordingly an object of this invention to provide a device which shape-preservingly clamps at least a portion of the last row of newly thermoformed articles of a completed shot as the indexing operation is completed and before the main surface area of the mold plugs contact the sheet.

It is another object to provide a device that continues to exert a desired clamping pressure for restoring and/or maintaining the desired shape during the molding of the succeeding shot.

It is further an object to provide a device that maintains this clamping pressure while the mold plugs are withdrawing from the thermoformed articles of the succeeding shot.

In accordance with these objects and the principles of this invention, a shape-preserving device is herein provided that exerts a desired clamping pressure upon a selected portion of the last row of newly thermoformed articles, of the previous shot, beginning as the indexing operation is completed and ending before the next indexing operation begins. This shape-preserving device comprises a support die or cavity and a pressure-exerting remolding shoe assembly.

The shape-preserving device of the present invention overcomes the limitations of current practices by providing a means for: (a) clamping the previously formed parts in the desired shape as the mold is closing, (b) holding the formed parts in the desired shape while the next segment of thermoformable material is being formed by the mold, (c) maintaining the desired shape during a portion of the mold opening, and (d) extending to a ready position for the next cycle as the mold fully opens.

More specifically, the shape-preserving device of this invention broadly comprises a portion of a mold cavity, which is rigidly attached to the mold cavity platen, and a remolding shoe assembly which comprises a floating remolding shoe, a pressure means for pushing the shoe towards the sheet at a constant pressure, such a 1–10 psi exerted on the selected portion of the thermoformed articles, a base plate which is rigidly attached to the mold plug base, and a guide means for slideably connecting the shoe to the base plate and for maintaining the shoe in parallel alignment with the adjacent mold plug. The pressure means is preferably a pressurized fluid-actuated cylinder and its piston rod, to one end of which the shoe is attached. The pressurized fluid is preferably compressed air. The cylinder is attached to and supported by the base plate and is in unimpeded flow communication with a source of compressed air. The guide means is preferably a pair of guide rods which are slideably attached at one end to a rigid foundation and at the other end to the remolding shoe. The guide rods preferably straddle the piston rod. The remolding shoe is a remolding plug shoe which precisely corresponds to the reform or remolding cavity, less the mold gap designed into a selected portion of the mold cavity and mold plug while a corresponding selected portion of a newly thermoformed plastic article, such as a meat tray, is clamped therebetween. The selected portion of a meat tray is preferably the outer wall and adjacent floor of the last tray of the preceding shot.

The support die is preferably attached to the cavity platen and reciprocates with it. The pressure-exerting shoe assembly is preferably floatingly attached to the plug platen and also reciprocates with it while moving independently thereof to a desired extent. However, the attachments of the support die or cavity and the remolding shoe assembly can be interchanged if desired.

Other fluids than air are satisfactory for use in the pressure means, and an axially loaded helical compression spring is also suitable but less desirable. In general, any pressure-creating means that will maintain a selected pressure or pressure range may be used for exerting a clamping force between the die and the shoe whenever they are brought into sufficiently close proximity by reciprocating movement of the cavity and plug platens.

Instead of connecting a fluid-actuated cylinder in unimpeded flow communication with a source of a pressurized fluid, it is alternatively feasible to utilize a position sensing means for detecting the position of the mold section supporting the remolding shoe assembly and a fluid control means for releasing pressurized fluid from the cylinder and for admitting such fluid thereto in synchronization with the molding machine. Instead of installing a special position sensing means, such as a limit switch, it is also satisfactory to connect the fluid control means, such as solenoid-operated valves, to one of the existing limit switches that are used to control the indexing operation, for example; on to an independently mounted position sensing device.

The cylinder for cylinder rod 41 is thereby operated in a programmed manner as a selectively operable fluid motor. An advantage of doing so that partly compensates for additional complexity is the savings in length of travel of the mold section supporting the floating shoe assembly.

BRIEF DESCRIPTION OF THE DRAWINGS

FIG. 4 is a perspective view of one shoe in elevated position and of a portion of one mold plug adjacent thereto.

FIG. 5 is a plan view of the floating remolding shoe, as a mold plug.

FIG. 6 is a side elevation (partially in section) of the floating remolding shoe seen in FIGS. 4 and 5.

FIG. 7 is a plan view of a remolding mold cavity and a portion of one tray adjacent thereto.

FIG. 8 is a sectional elevation of the mold cavity seen in FIG. 7.

DESCRIPTION OF THE PREFERRED EMBODIMENT

Figure 1:
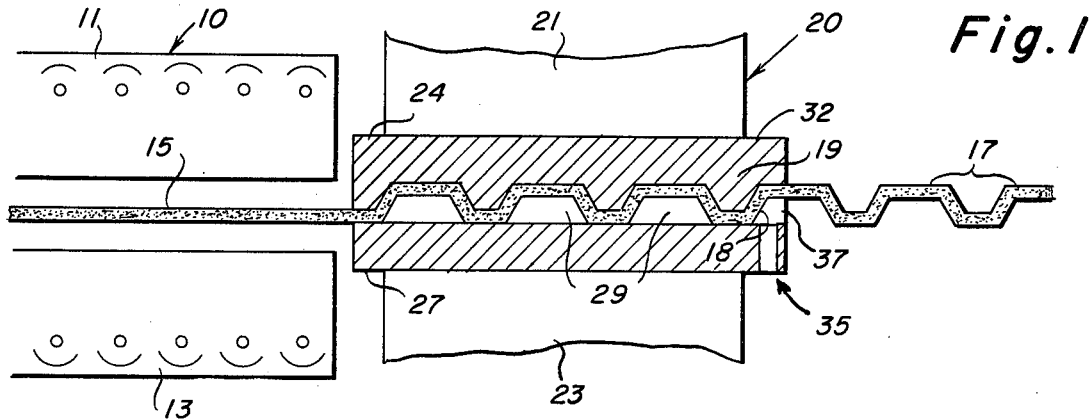
FIG. 1 is a schematic sectional elevation of an oven and molding machine having the shape-preserving device of this invention attached thereto, with the cavity and plug platens in closed position upon a heat-softened thermoplastic sheet.
Figure 2:
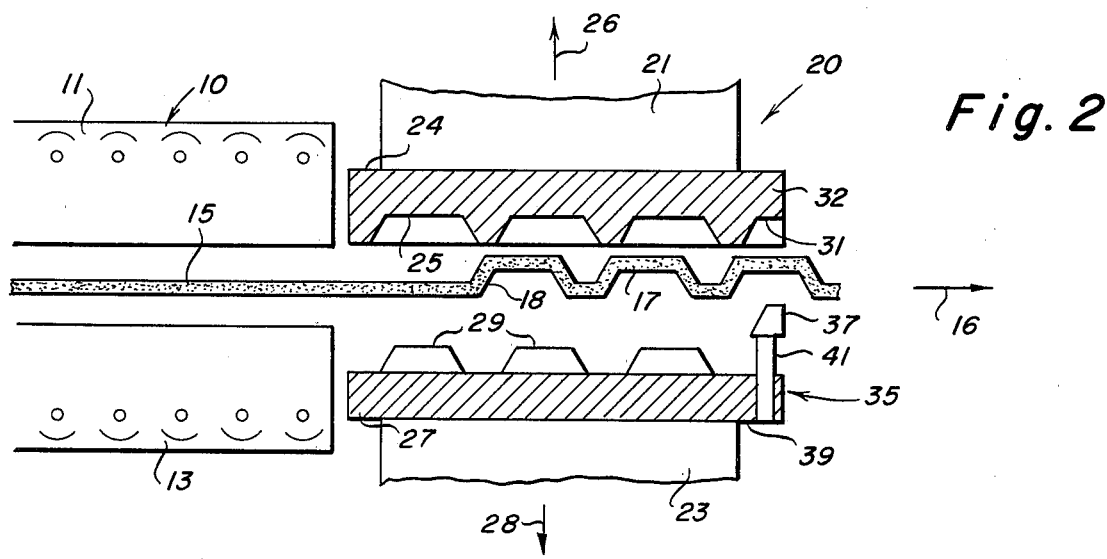
FIG. 2 is another sectional elevation, similar to FIG. 1, wherein the cavity and plug platens have moved apart, and the heat-softened thermoplastic sheet is partially indexed to the right and horizontally through the molding machine.
Figure 3:
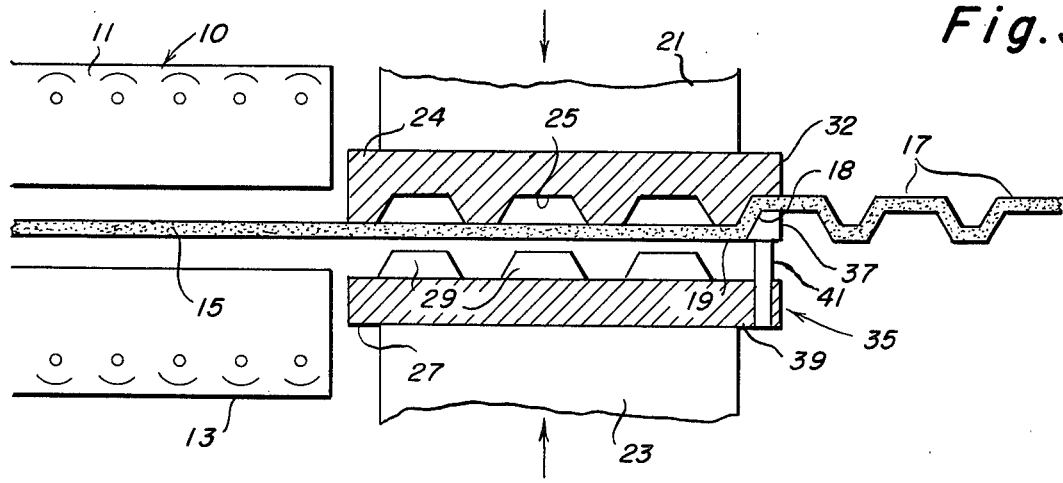
FIG. 3 is also a schematic sectional elevation, similar to FIGS. 1 and 2, wherein the top mold section is fully closed to the sheet line and the bottom mold section is in process of closing and is at the position where the elevated remolding shoe has pinched or clamped the last tray in each row of the previously thermoformed shot and remains in this position, relative to the opposing mold cavity, while the bottom mold section continues to close toward the sheet.

The shape-preserving device that is shown in FIGS. 1-8 involves additional hardware that is added to a typical matched metal polystyrene foam production mold, as an example, and its use involves a method for correcting product distortion in the last row of molded parts in each mold shot. Specific vacuum, cooling, and adapter plates are not illustrated in the drawings. FIGS. 1-3 illustrate the concept schematically and show how the remolding shoe pinches, and reshapes if necessary, the rear section of the formed parts in the previous mold shot while the current mold shot is being formed. Capture of the previously formed part in this manner corrects the possibilities of the existing part being deformed by machine-direction orientation forces or by tensile forces in the sheet while the current mold shot is being formed.

As seen in FIGS. 1-3, a thermoformable sheet 15 passes through a heat-softening oven 10, comprising a top oven 11 and a bottom oven 13, and then enters the thermoformer molding station of the molding machine 20 which comprises an upper platen 21, a lower platen 23, a plurality of mold cavities 25 in mold plate 24, a mold plug base 27, and a plurality of mold plugs 29. While upper platen 21 and lower platen 23 are clamped together with thermoformable sheet 15 therebetween, as seen particularly in FIG. 1, a plurality of trays 17 are formed. Formation of trays 17 may be assisted by a vacuum exerted through channels in mold cavities 25 and/or mold plugs 29. Trays 17 are solidified or hardened by cooling between mold cavities 25 and mold plugs 29 for a brief time interval, as is known in the art.

At the expiration of this time interval, upper platen 21 and lower platen 23 move apart in respective upward movement 26 and downward movement 28, as seen in FIG. 2. Remolding shoe assembly 35, comprising horizontal extension 32 of mold platen 24 which contains remolding cavity 31, remolding shoe 37, base plate 39 as a horizontal extension of mold plug base plate 27, piston rod 41, and guide rods 43, continues to exert upward pressure, while lower platen 23 moves downwardly, until piston rod 41 is fully extended. This upward pressure is exerted against rearward wall 18 and a portion of the adjacent floor of the last row of trays of the preceeding shot. The upward pressure is resisted by remolding cavity 31, as a horizontal extension of the plate containing mold cavities 24. When platens 21, 23 have moved upwardly and downwardly, respectively, an additional slight distance that allows the intervening strips between adjacent trays 17 to clear remolding shoe 37, the indexing of thermoformable sheet 15 occurs in direction 16, as seen in FIG. 2.

As indexing operation 16 is completed, platens 21, 23 move toward each other, as indicated by their respective arrows in FIG. 3, so that mold cavity 31 and shoe 37 almost immediately contact and clamp rearmost wall 18 and the adjacent floor of the last tray of the preceding shot. This wall 18 is adjacent to strip 19 along which deformation stresses are exerted while molds 25, 29 are coming together on the succeeding shot. At this time, piston rod 41 is fully extended so that clamping pressure is exerted against adjacent wall 18 and the bottom of the last tray 17 between shoe 37 and mold cavity 31 which simultaneously contacts the other side of wall 18 and a corresponding portion of the floor of last tray 17. As this clamping action occurs, deformed rear wall 18 of a rearmost tray 17 is reformed or remolded to the proper shape and held in shape position while forming platens 21, 23 continue to close, thereby forming the next group or shot of plastic articles.

Lower platen 23 continues to move upwardly, thereby decreasing the length of piston rod 41, until mold plugs 29 contact softened sheet 15 and form it into the desired product shape as shown in FIG. 1, possibly being assisted by a vacuum exerted through channels in mold cavity 25 and/or mold plugs 29.

Extension 39 of mold plug base plate 27 has a notch 45 for piston rod 41 and guide holes 46 to accept guide rods 43. Remolding shoe 37 has a pair of circular recesses 47 for ends of guide rods 43. Horizontal extension 39 of mold platen 27 supports remolding shoe 37. Extensions 32,39 each extend in forward direction 16 approximately the same distance laterally beyond the usual forward edges of the respective platens 24,27 in straddling relationship to rearmost wall 18 after forward indexing of sheet 15 in direction 16.

Mold cavity 31 and remolding shoe 37 are shaped, sized, and positioned so that they close on adjacent wall 18 and a portion of the floor of the last tray 17 and recreate the same mold gap, against each other, which is provided in the rear of the molding machine when the part was formed in the previous shot. As the bottom mold section continues to close, remolding shoe 37 remains in this position relative to cavity mold 31, thereby maintaining the desired product shape. However, as the bottom mold closes, it slides up on the guiding hardware, i.e., piston rod 41 and guide rods 43 of remolding shoe assembly 35, so that in the full mold closed position, remolding shoe 37 is at the same height as plugs 29 of the male mold section.

As the mold close time is completed and the molding machine begins to open, remolding shoe 37 remains in contact with wall 18 until piston rod 41 is again extended to full stroke. Remolding shoe 37 remains in this extended position while separating from wall 18 as the molding machine continues to open to full open position; it is ready to repeat the cycle after the next index of the foam material.

Lower platen 23 moves downwardly in direction 28 a distance that is typically no more than one inch greater than the depth of the thermoformed article. Meat trays are designed in several sizes such as 2S, 4S, 8S, and 12S and the like. The outside depth of a typical tray of this series, for example, is 0.300 to 0.700 inch or more, and the vertical depth inside a tray is typically 0.200-0.500 inch or more. The extensible length of piston rod 41 is about 1.0 inch when used with such trays but would be longer when used with trays of greater depth. Although this embodiment has been described with respect to meat trays, it is applicable to any type of thermoformed article, such as egg cartons, fast food containers, tote boxes, protective packaging inserts, and the like.

A suitable pressure for operating the cylinder to which piston rod 41 is attached is 20 psi. However, any pressure that is satisfactory for an individual machine may be used. Moreover, a long-stroke helical compression spring within a hollow piston rod 41 or other similar device may be used to replace a pneumatic system operating a cylinder as described hereinbefore.

Because it will be readily apparent to those skilled in the thermoforming art that innumerable variations, modifications, applications, and extensions of these embodiments and principles can be made without departing from the spirit and scope of the invention, what is hereby defined as such scope and is desired to be protected should be measured, and the invention should be limited, only by the following claims.

What is claimed is:

1. In the high-speed thermoforming of articles from a heat-softened thermoplastic sheet by:
   (1) a reciprocative thermoforming cycle comprising reciprocative opening and closing of a molding machine, having mold cavities and opposed mold plugs supported by a pair of platens, to form a plurality of molded articles between said cavities and said plugs, said articles having a selected thermoformed depth, and
   (2) intermittent forward indexing of said sheet after each said reciprocative opening in order to remove said plurality of molded articles from said machine, whereby a rearmost portion of at least one said molded article is substantially adjacent to said machine after said indexing and is:
      (a) potentially distorted in shape by machine-direction orientation stresses after said reciprocative opening and during said indexing, so that said rearmost portion is apt to be deformed before said next thermoforming cycle begins, and
      (b) subject to tensile stresses occurring in the plane of said sheet during the interval between the time that said mold cavities contact one surface of said sheet and the time that said mold plugs reach their full closed position, said tensile stresses being transmitted as stretching forces that tend to draw said rearmost portion toward said adjacent machine and thereby cause distortion of said rearmost portion,
   a shape-preserving method for remolding said rearmost portion by exerting a selected clamping pressure upon said rearmost portion, beginning as said forward indexing is completed and ending before the next forward indexing is begun after the next reciprocative opening.

2. The shape-preserving method of claim 1 which further comprises:
   A. after said forward indexing, contacting said rearmost portion with a remolding cavity on one side and a remolding plug on the other side thereof;
   B. exerting a selected clamping pressure upon said rearmost portion while said mold cavities and said mold plugs begin to close to full closed position, with said thermoplastic sheet compressed therebetween, as part of said next reciprocative closing,
   C. maintaining said selected pressure while said platens remain in said full closed position to complete said forming of said molded articles during said next reciprocative cycle;
   D. maintaining said selected pressure while at least one said platen moves away from said thermoformed articles through a selected distance as a portion of said reciprocative opening; and
   E. extending to a ready position for the next cycle as said molding machine fully opens at the end of said next reciprocative cycle.

3. The shape-preserving method of claim 2, wherein said constant pressure is maintained by pressurized air which is in unimpeded flow communication with a source thereof and is connected to a pneumatic cylinder having a piston rod attached to said shoe.

4. The shape-preserving method of claim 2, wherein said contacting and remolding occurs in step A of claim 2 during the initial portion of said second shot and of each succeeding shot thereafter when said mold cavity supporting platen advances its mold cavities to a fresh surface of said heat-softened sheet.

5. The shape-preserving method of claim 4, wherein said contacting and said remolding of said rearmost portion occurs between said remolding cavity and said floating remolding shoe, said remolding cavity and said shoe being shaped, sized, and positioned so that they recreate the same mold gap which is provided in the rear of said molding machine during said first mold shot.

6. The shape-preserving method of claim 2, wherein said distance in Step D of claim 2 is measured perpendicularly to said sheet and at least equals said thermoformed depth.

7. In a high-speed thermoforming machine having a pair of platens and at least one pair of matched mold cavities and mold plugs attached thereto, wherein a heat-softened thermoformable sheet is indexed forward an amount that is at least equal to the length of said platens while said mold cavities and said mold plugs are reciprocatingly in open position after producing a first shot of thermoformed articles therebetween, said articles having a selected outside depth, a device for correcting product distortion that shape-preservingly clamps a selected portion of the last row of said thermoformed articles and maintains a selected shape-preserving pressure thereupon until said cavities and plugs have reciprocatively moved apart, comprising:
   A. a remolding cavity which is attached to and disposed beyond one said platen on the forward side thereof;
   B. a remolding shoe which is attached to and disposed beyond the other said platen on the forward side thereof, whereby said selected portion is straddled by said remolding cavity and said remolding shoe when said sheet has been indexed forward by said amount; and
   C. a pressure-exerting means for:
      (1) clamping said selected portion between said remolding cavity and said remolding shoe as said cavities and said plugs are reciprocatively closing towards said thermoformable sheet,
      (2) holding said selected portion in the desired shape while the next shot of thermoformed articles are being formed between said cavities and said plugs,
      (3) maintaining said desired shape during a portion of the moving apart of said cavities and said plugs, and
      (4) extending said remolding shoe to a distance that is greater than said outside depth as said thermoformable machine fully opens.

8. A shape-preserving device for use in combination with a thermoforming molding machine which reciprocatingly thermoforms articles from a heat-softened thermoplastic sheet and thereafter indexes said sheet in a forward direction, said molding machine comprising an upper platen and a lower platen, and said device comprising:
   A. a lateral extension of said upper platen, said extension being disposed in said forward direction;
   B. a lateral extension of said lower platen, said extension being disposed in said forward direction;
   C. a remolding cavity which is formed in one of said lateral extensions; and
   D. a remolding shoe assembly which comprises:

(1) a floating remolding shoe, which conforms to said remolding cavity in shape, less the mold gap designed thereinto, (2) a pressure means for pressing said remolding shoe toward said remolding cavity, said pressure means being attached to the other of said lateral extensions, and (3) a guide means for slideably aligning said remolding shoe with said remolding cavity while said molding machine is reciprocatingly opening and closing, said guide means being a portion of said other lateral extension.

9. The device of claim 8, wherein said pressure means comprises a pressurized fluid-actuated cylinder and a piston rod connected thereto and to said remolding shoe.

10. The device of claim 9, wherein said pressurized fluid is compressed air provided at a constant pressure from a source thereof which is in unimpeded flow communication with said cylinder.

11. The device of claim 8, wherein said pressure means comprises a helical spring within a telescopable hollow piston rod which is attached at one end to said remolding shoe at the other end to said lower platen.

12. The device of claim 8 or 9, wherein said guide means comprises at least one guide rod which is attached at one end to said remolding shoe.

13. The device of claim 12, wherein said piston rod has a stroke length which is equal to or greater than the depth of the thermoplastic article being formed.

* * * * *